(12) United States Patent
Nagel et al.

(10) Patent No.: US 8,354,460 B2
(45) Date of Patent: Jan. 15, 2013

(54) MATTE CLEAR COAT ENAMEL AND SUBSTRATES COATED THEREWITH

(75) Inventors: Axel Nagel, Oberstenfeld (DE); Florian Stritzelberger, Bietigheim (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 250 days.

(21) Appl. No.: 12/909,900

(22) Filed: Oct. 22, 2010

(65) Prior Publication Data

US 2011/0105645 A1    May 5, 2011

(51) Int. Cl.
  *C08K 7/00*    (2006.01)
(52) U.S. Cl. ........ 523/220; 524/404; 524/420; 524/424; 524/425; 524/428; 524/430; 524/442
(58) Field of Classification Search .................. 523/220; 524/404, 420, 424, 425, 428, 430, 442
  See application file for complete search history.

(56) References Cited

U.S. PATENT DOCUMENTS 6,657,001 B1    12/2003    Anderson et al. ............. 524/588

FOREIGN PATENT DOCUMENTS

| JP | 2007171984 A | 7/2007 |
|---|---|---|
| JP | 2007183653 A | 7/2007 |

*Primary Examiner* — Edward Cain
(74) *Attorney, Agent, or Firm* — William J. Uhl

(57) ABSTRACT

The present invention relates to a clear coat enamel composition comprising:
  a) at least one film-forming resin with at least two functional groups,
  b) at least one colorless particulate inorganic material having an average particle size of 1-500 nm before being introduced into the coating composition,
  c) at least one polysiloxane having at least one functional group,
  d) at least one colorless particulate inorganic material having an average particle size of 1-10 μm which is preferably not surface-modified, before being introduced into the coating composition,
  e) at least one crosslinking agent with at least two functional groups, which are reactive with the functional groups of the film-forming resin (a) and/or with the functional groups of the polysiloxane (c),
  f) optionally a component based on polyurea,
wherein the components (a), (c), (e) and (f) are each different, composite coatings comprising a base coat enamel containing colored pigments and/or effect pigments and a clear coat enamel which is applied from this clear coat enamel composition to at least a portion of the base coat enamel layer, and substrates coated therewith.

23 Claims, No Drawings

MATTE CLEAR COAT ENAMEL AND SUBSTRATES COATED THEREWITH

CROSS-REFERENCE TO RELATED APPLICATIONS

This application claims the benefit of German Patent Application No. 20 2009 014 619.7, filed 29 Oct. 2009.

The present invention relates to a coating composition which yields a matte clear coat enamel, a composite coating containing a base coat enamel, which in turn contains colored pigments and/or effect pigments and the matte clear coat enamel, which is applied to the base coat enamel layer as well as objects provided with the clear coat enamel or with the composite coating.

Composite coating systems in which a base coat enamel containing colored pigments and/or effect pigments is applied to a substrate and a clear coat enamel is applied to this base coat enamel are becoming increasingly important for enamel coating of utilitarian articles. Such paint plus clear coat enamel coating systems have been used in the prior art in automobiles, aviation applications, floor coverings such as ceramic tiles and wood floor coverings as well as for coating packaging systems. Such paint plus clear coat enamel coating systems have become especially important for enameling automotive bodies and parts thereof. The clear coat enamel must fulfill various functions in this application and therefore must have a corresponding profile of properties. The clear coat enamel serves in particular to protect the underlying layers from chemical as well as mechanical stress. In addition, the clear coat enamel also determines the aesthetic impression of the enameled object, in particular its gloss.

Highly scratch-resistant clear coat enamels and clear coat enamel coating compositions for producing same are known from WO 2001/09261 or WO 2001/09260, for example. The clear coat enamel compositions described there also contain nanoscale inorganic particles in combination with a surface-active substance, in particular a functional polysiloxane compound, together with a film-forming resin and corresponding crosslinking agents. The hardened clear coat enamel layers applied using these compositions have a very high scratch resistance while also having a comparatively high gloss.

Against the background of this prior art, the object of the present invention was to provide a clear coat enamel composition which would lead to a matte clear coat enamel having a further improved scratch resistance in comparison with the prior art cited above. In particular, the object of the present invention is to provide a clear coat enamel composition with which lower gloss values are achieved for composite coating systems, such that this gloss preferably does not change at all even under mechanical loads such as those encountered in car wash lines, so that in the case of an automotive body, for example, there will not be any interfering variations in gloss, depending on the mechanical load on the respective body parts.

This object is surprisingly achieved by a clear coat enamel composition containing
a) at least one film-forming resin with at least two functional groups,
b) at least one colorless particulate inorganic material having an average particle size of 1-500 nm before being introduced into the coating composition,
c) at least one polysiloxane having at least one functional group,
d) at least one colorless particulate inorganic material having an average particle size of 1-10 μm, which is preferably not surface-modified, before being introduced into the coating composition,
e) at least one crosslinking agent with at least two functional groups which are reactive with the functional groups of the film-forming resin (a) and/or with the functional groups of the polysiloxane (c),
f) optionally a component based on polyurea,
wherein the components (a), (c), (e) and (f) are each different.

In comparison with conventional matte/clear coat enamel systems, the inventive clear coat enamel composition not only achieves the object defined above but also solves the problem of a varying gloss value, depending on locations in the underlying base coat enamel layer which are dried to different extents, which can thus also lead to an aesthetically undesirable variation in the gloss of an object enameled with such a base coat enamel/clear coat enamel coating.

The present invention also relates to composite coatings in which the inventive clear coat enamel composition is applied to a conventional base coat enamel layer containing colored pigments and/or effect pigments, e.g., metallic or pearl effect enamels.

A more detailed description of the base coat enamel composition will not be given here in conjunction with the present invention because such compositions are essentially familiar to those skilled in the art from the prior art. The base coat enamel layer may be hardened before applying the clear coat enamel composition or, as is customary today, the base coat enamel layer is applied first, air dried briefly and then the clear coat enamel composition is applied to the base coat enamel composition, which has not yet hardened, in the so-called wet-on-wet method, and the two layers are then baked on jointly to form a cured and hardened enamel layer.

The present invention is also directed toward an object comprising a substrate and a layer of a cured and hardened, inventive clear coat enamel composition or an inventive composite coating.

The inventive clear coat enamel composition and/or the inventive composite coating is/are suitable in particular for enameling automotive bodies or parts thereof.

The inventive clear coat enamel composition is described in detail below.

Component (a)

Film-forming resins containing at least two functional groups which react with corresponding functional groups on the crosslinking agent during the crosslinking reaction may be used as component (a). The at least one film-forming resin may contain two or more reactive functional groups which are selected from hydroxyl groups, carbamate groups, epoxy groups, isocyanate groups, carboxylic acid groups and mixtures of any of the aforementioned groups.

Hydroxy functional polymers selected from polyacrylic polyols, polyester polyols, polyurethane polyols, polyether polyols and mixtures of the aforementioned polymers, for example, have proven to be especially suitable. Suitable polyols have a hydroxyl value of 100 to 200 mg KOH/g. The hydroxyl value can be measured according to ASTM-E 222.

Suitable acrylic polymers containing hydroxyl groups and/or carboxyl groups can be synthesized from polymerizable ethylenically unsaturated monomers and may comprise copolymers of (meth)acrylic acid and/or hydroxyalkyl esters of (meth)acrylic acid having one or more other polymerizable ethylenically unsaturated monomers, e.g., alkyl esters of (meth)acrylic acid including methyl acrylate, ethyl methacrylate, butyl methacrylate, 2-ethylhexyl acrylate and isobornyl (meth)acrylate and vinyl aromatic compounds, e.g., styrene, α-methylstyrene and vinyltoluene. Suitable hydroxyalkyl esters include, for example, hydroxyethyl(meth)acrylate or 2-hydroxypropyl(meth)acrylate. Other suitable hydroxy functional monomers include unsaturated β-hydroxy ester functional monomers. Such monomers can be synthesized by reaction of a monomer having an ethylenically unsaturated acid function, e.g., (meth)acrylic acid, and an epoxy compound, which does not participate in the radical polymerization. Examples of such epoxy compounds include glycidyl ethers and glycidyl esters. Suitable glycidyl esters comprise the glycidyl esters of branched carboxylic acids, which are available commercially under the brand name CARDURA E from Shell Chemical Co. Alternatively, the β-hydroxy functional monomers may be synthesized from a monomer having an ethylenically unsaturated epoxy function, e.g., glycidyl (meth)acrylate and allyl glycidyl ethers, and a saturated carboxylic acid such as a saturated monocarboxylic acid, e.g., isostearic acid.

Epoxy functional groups may be introduced into the polymer by polymerization of ethylenically unsaturated monomers containing oxirane groups, e.g., glycidyl(meth)acrylate and allylglycidyl ethers. Carbamate functional groups can be introduced into the polymer by copolymerization by carbamate functional vinyl polymers, such as a carbamate functional alkyl ester of (meth)acrylic acid. Carbamate functional alkyl esters that may be used may be synthesized by reaction of, for example, a hydroxyalkyl carbamate, which may be a reaction product of ammonia and ethylene carbonate or propylene carbonate, with (meth)acrylic acid. Other carbamate functional vinyl monomers that may be used include, for example, the reaction product of hydroxyethyl (meth)acrylate, isophorone isocyanate and hydroxycarbyl carbamate [sic] or the reaction product of hydroxypropyl(meth)acrylate, isophorone diisocyanate and methanol. Other carbamate functional vinyl monomers may also be used, such as the reaction product of isocyanic acid (HNCO) with a hydroxy functional acrylic or methacrylic monomer such as hydroxyethyl acrylate. Carbamate functional groups may also be introduced into the acrylic polymer by reaction of a hydroxy functional acrylic polymer with an alkyl carbamate having a low molecular weight, such as methyl carbamate.

Acrylic polymers synthesized from polymerizable ethylenically unsaturated monomers can be synthesized by solution polymerization techniques with which those skilled in the art are familiar, in the presence of suitable catalysts such as organic peroxides or azo compounds, e.g., benzoyl peroxide or N,N-azobisisobutyronitrile. The polymerization may be performed in an organic solution in which the monomers are soluble. Alternatively, these polymers may be synthesized by aqueous emulsion polymerization or dispersion polymerization techniques with which those skilled in the art are familiar. The ratio of reactants and the reaction conditions are selected to obtain an acrylic polymer having the desired functionality.

Polyester polymers can also be used in the inventive clear coat enamel compositions. Suitable polyester polymers may comprise the condensation products of polyvalent alcohols and polycarboxylic acids. Examples of suitable polyvalent alcohols include ethylene glycol, neopentyl glycol, trimethylolpropane and pentaerythritol. Examples of suitable polycarboxylic acids include adipic acid, 1,4-cyclohexyldicarboxylic acid and hexahydrophthalic acid. In addition to the polycarboxylic acids mentioned above, functional equivalents of the acid, such as anhydrides, where they exist, or low alkyl esters of the acids such as methyl esters may be used. Small amounts of monocarboxylic acids such as stearic acid may also be used. The ratio of reactants and the reaction conditions are selected to obtain a polyester polymer having the desired functionality, i.e., a carboxyl or hydroxyl functionality.

Carbamate functional polyesters can be synthesized by first forming a hydroxyalkyl carbamate, which can then be reacted with the polyacids and polyols used to form the polyester. Alternatively, carbamate functional end groups may be incorporated into the polyester by reaction of isocyanic acid with a hydroxy functional polyester. A carbamate functionality may also be introduced into the polyester by reaction of a hydroxyl polyester with a urea.

Polyurethane polymers which are also suitable as film-forming resins according to the present invention may contain isocyanate end groups or hydroxyl end groups. Polyurethane polymers may be synthesized by reacting polyols including polymeric polyols with polyisocyanates. The hydroxyl/isocyanate equivalent ratio may be adjusted and the reaction conditions may be selected accordingly to obtain the desired end groups. Carbamate functional groups may be introduced into the polyurethane polymers by reaction of a polyisocyanate with a polyester having a hydroxyl functionality which contains side carbamate groups.

Alternatively, the polyurethane may be synthesized by reacting a polyisocyanate with a polyester polyol and a hydroxyalkylcarbamate or isocyanic acid as separate reactants. Examples of suitable polyisocyanates include aromatic isocyanates, e.g., 4,4'-diphenylmethane diisocyanate, 1,3-phenylene diisocyanate and toluene diisocyanate, and aliphatic polyisocyanates, such as 1,4-tetramethylene diisocyanate and 1,6-hexylmethylene diisocyanate. Cycloaliphatic diisocyanates, e.g., 1,4-cyclohexyl diisocyanate and isophorone diisocyanate may also be used. Examples of suitable polyether polyols include: polyalkylene ether polyol, e.g., polyoxy-tetramethylene glycol, polyoxytetraethylene glycol, polyoxy-1,2-propylene glycol and polyoxy-1,2-butylene glycol. Also suitable are polyether polyols which are formed by alkoxylation of various polyols, e.g., glycols such as ethylene glycol, 1,6-hexanediol, bisphenol A or other higher polyols such as trimethylolpropane, pentaerythritol. Polyols of higher functionality can be synthesized, e.g., by alkoxylation of compounds, sucrose or sorbitol. One alkoxylation method that may be used is the reaction of a polyol with an alkylene oxide, including but not limited to propylene oxide or ethylene oxide in the presence of an acidic or basic catalyst. Examples of polyethers include those distributed under the brand names Terratane and Terrako by E.I. Du Pont de Nemours & Co. Inc.

The film-forming resins which are suitable according to component (a) of the inventive clear coat enamel composition may have a weight-average molecular weight in the range of 1000 to 20,000, determined by gel permeation chromatography using a polystyrene standard. Especially suitable are polymers having a weight-average molecular weight in the range of 1500 to 15,000, in particular 2000 to 12,000. The resin component (a) may be present in the inventive clear coat enamel composition in an amount of 25 to 75 wt %, preferably 40 to 60 wt %, based on the resin solids. Use of a combination of polyacrylic polyols and polyester polyols has proven to be especially suitable. Suitable mixing ratios of polyacrylic polyols to polyester polyols may be 10:1 to 2:1, in particular 7:1 to 3:1, based on the weight of the polyols. The expression "based on the total solids of the composition" means that the component is based on the weight of the total resin solids (nonvolatile components) of the film-forming resins, the crosslinking agents, the polysiloxane and, if present, the polyurea compound. The total resin solids do not include the various particulate materials, solvents and other additives, e.g., stabilizers, catalysts or flow control aids.

Component (b)

Component (b) of the inventive clear coat enamel composition may be selected from any colorless particulate inorganic material having an average particle size of 1 to 500 nm before being introduced into the clear coat enamel composition. In suitable embodiments, the average particle size is 1 to 100 nm or 1 to 50 nm.

The average particle size can be determined by visual inspection of an electron micrograph of a transmission electron microscope image (TEM image), measuring the diameter of the particles in the image and calculating the average particle size on the basis of the enlargement of the TEM image. Those skilled in the art understand how such a TEM image is created. According to one embodiment of the present invention, a TEM image with a 105,000-fold magnification is prepared and a conversion factor is obtained by dividing the magnification by 1000. After visual analysis, the diameter of the particles is measured in mm and the measurement is converted to nm by using the conversion factor. The diameters of the particles are based on the smallest diameter of the sphere surrounding the particle completely.

The particles according to component (b) suitable for use in the clear coat enamel composition according to the present invention include in particular ceramic materials, e.g., metal oxides, metal nitrides, metal carbides, metal sulfides, metal silicates, metal borides, metal carbonates and mixtures thereof. Examples of metal nitrides include, for example, boron nitride. Examples of metal oxides include silicon dioxide in its various embodiments, e.g., colloidal silicic acid, quartz dust or amorphous silicic acid, aluminum oxide, e.g., colloidal aluminum oxide, titanium dioxide, cesium oxide, yttrium oxide, e.g., colloidal yttrium oxide, zirconium oxide, e.g., colloidal or amorphous zirconium oxide or zinc oxide. Examples of suitable metal sulfides include zinc oxide.

In a suitable embodiment, component (b) contains colloidal silicic acid. Component (b) may be present in the inventive clear coat enamel composition in an amount of 0.01 to 20 wt %, preferably 0.01 to 10 wt %, based on the resin solids.

Component (c)

Component (c) according to the inventive clear coat enamel composition contains at least one polysiloxane having at least one functional group.

Suitable polysiloxanes have the following structure (I) or (II):

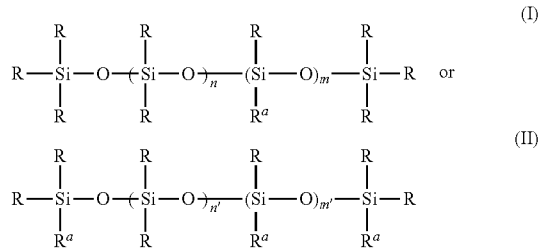

where m has a value of at least 1,
m' ranges from 0 to 75,
n ranges from 0 to 75,
n' ranges from 0 to 75, each R, independently of the others, is selected from H, OH, single-bond hydrocarbon radicals, single-bond nonfunctional siloxane groups and combinations thereof, and $R^a$ has the following structure (III):

$$—R^3—X \quad \text{(III)}$$

where $—R^3$ is selected from two-bond organic radicals, preferably selected from alkylene, alkoxylene, alkylene aryl, alkenylene, oxyalkenylene and alkenylene aryl groups and X stands for a group having at least one reactive functional group.

In formulas (I) and (II), (n+m) and/or (n'+m') range from 2 to 9, preferably from 2 to 3.

The reactive functional group of the siloxane component may be selected from a hydroxyl, carboxyl, isocyanate, blocked isocyanate, primary amine, secondary amine, amide, carbamate, urea, urethane, vinyl, unsaturated ester, fumarate, maleimide, anhydride, hydroxyalkylamide and an epoxy group.

Polysiloxanes having at least two hydroxyl groups per molecule are especially suitable. In formula (I) or (II), alkylene refers to a cyclic or acyclic saturated hydrocarbon group with a carbon chain length of $C_2$ to $C_{25}$. Examples of suitable alkylene groups include propenyl, 1-butenyl, 1-pentenyl and 1-decenyl.

Alkoxylene refers to an alkylene group containing at least one oxygen atom which is bound to two carbons and is arranged between them and has an alkylene carbon chain of $C_2$ to $C_{25}$. Examples of suitable alkoxylene groups include those derived from trimethylolpropane monoallyl ether, trimethylolpropane diallyl ether, pentaerythritol monoallyl ether, polyethoxylated allyl alcohol and polypropoxylated alkyl alcohol.

Alkylene aryl refers to acyclic alkylene groups substituted with at least one aryl group, e.g., phenyl, and having an alkylene carbon chain length of 2 to 25. Examples of suitable alkylene aryl groups include those derived from styrene or 6,3-isopropenyl-α,α-dimethylbenzyl isocyanate. Alkenylene refers to a cyclic or acyclic hydrocarbon group with one or more double bonds and with an alkenylene carbon chain length of preferably $C_2$ to $C_{25}$. Examples of suitable alkenylene groups include those derived from propargyl alcohol and acetylenic diols, e.g., 2,4,7,9-tetramethyl-5-decine-4,7-diol, which is available commercially as SURFYNOL 104 from Air Products Chemicals, Inc., Allantown [sic], Pa. According to one embodiment of the present invention, the polysiloxane is the reaction product of a polysiloxane of formula (IV)[1]

[1] Translator's Note: Source error. The formula number referenced in the sentence is "IV", but the number Identifying the formula in the image is "IV".

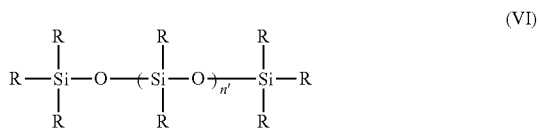

in which each substituent group R, which may be the same or different, denotes a group selected from H, OH, a monovalent hydrocarbon group, a monovalent nonfunctional siloxane group and mixtures of any of the aforementioned groups, where at least one of the groups represented by R is H, and n' is in the range of 0 to 100, in particular in the range of 0 to 10 and/or 0 to 5, such that the percentage SiH content of the polysiloxane is in the range of 2% to 50% and/or in the range of 5% to 25%, and at least one molecule which contains at least one functional group as defined above and at least one unsaturated bond capable of entering into a hydrosilylation reaction. In one embodiment, the at least one functional group is selected from hydroxyl groups, as mentioned above.

Examples of polysiloxanes containing silicon hydrogen bonds include 1,1,3,3-tetramethylsiloxane in which n' is 0 and the average SiH functionality is 2, and a polymethylpolysiloxane containing silicon hydride in which n' is in the range of 4 to 5 and the average SiH functionality is approximately 2, such as that available commercially from BASF Corp. as MASILWAX BASE®.

Materials for use as the aforementioned reactant (ii) may include ally ethers containing hydroxyl functional groups such as those selected from trimethylolpropane monoallyl ether, pentaerythritol monoallyl ether, trimethylolpropane diallyl ether, polyalkoxyl alcohols such as polyethoxylated alcohol, polypropoxylated alcohol and polybutoxylated alcohol, undecylenic acid-epoxy adducts, allyl glycidyl ether-carboxylic acid adducts and mixtures of any of the aforementioned components. Mixtures of hydroxyl functional polyallyl ethers with hydroxyl functional monoallyl ethers or allyl alcohols are also suitable. In certain cases the reactant (ii) may contain at least one unsaturated bond in a terminal position. Reaction conditions and the ratio of reactants (i) and (ii) are selected so that the desired functional group is formed.

The polysiloxane containing the hydroxyl functional groups can be synthesized by reacting a polysiloxane containing hydroxyl functional groups with an anhydride to form the hemiester acid group under reaction conditions which promote only the reaction of the anhydride and hydroxyl functional groups and prevent the occurrence of further esterification. Nonrestrictive examples of suitable anhydrides include hexahydrophthalic acid anhydride, methyl hexahydrophthalic acid anhydride, phthalic acid anhydride, trimellitic acid anhydride, succinic acid anhydride, HET acid anhydride, alkenyl succinic acid anhydride and substituted alkenyl anhydrides such as octenyl succinic acid anhydride and mixtures of any of the aforementioned anhydrides.

The reaction product containing the hemiesters group synthesized in this way may also be reacted with a monoepoxide to form a polysiloxane containing secondary hydroxyl group(s). Nonrestrictive examples of suitable monoepoxides include phenyl glycidyl ether, n-butylglycidyl ether, cresylglycidyl ether, isopropylglycidyl ether, glycidyl versatate, e.g., CARDURA E obtainable from Shell Chemical Co., and mixtures of any of the aforementioned compounds.

In another embodiment, the present invention is directed at cured and hardened coatings, as described above, in which the at least one polysiloxane is a polysiloxane containing carbamate functional groups, comprising the reaction product of at least the following reactants:
(i) at least one polysiloxane containing silicon hydride and having the structure (IV) given above, where R and n' have the definitions given above for this structure,
(ii) at least one material that contains hydroxyl functional groups and having one or more unsaturated bonds, capable of entering into a hydrosilylation reaction as described above, and
(iii) at least one carbamate functional material having a low molecular weight, comprising the reaction product of an alcohol or glycol ether and a urea.

The carbamate functional groups may be incorporated into the polysiloxane by reacting the polysiloxane which contains hydroxyl functional groups with carbamate functional material having a low molecular weight by means of a "transcarbamoylation process." The carbamate functional material having a low molecular weight, which may be derived from an alcohol or glycol ether, may react with the free hydroxyl groups of a polysiloxane polysol[2], i.e., a material having an average of two or more hydroxyl groups per molecule, which yields a carbamate functional polysiloxane and the original alcohol or glycol ether. The reaction conditions and the ratio of reactants (i), (ii) and (iii) are selected so that the desired groups are formed.

[2] Translator's Note: Possible source error. The word "polysol" should most likely be "polyol".

The carbamate functional material having the low molecular weight can be synthesized by reacting the alcohol or glycol ether with urea in the presence of a catalyst such as butyl stannic acid. Nonrestrictive examples of suitable alcohols include aliphatic, cycloaliphatic and aromatic alcohols having a low molecular weight, e.g., methanol, ethanol, propanol, butanol, cyclohexanol, 2-ethylhexanol and 3-methylbutanol. Nonrestrictive examples of suitable glycol ethers include ethylene glycol methyl ether and propylene glycol methyl ether. The incorporation of carbamate functional groups into the polysiloxane may also be achieved by reacting isocyanic acid with free hydroxyl groups of the polysiloxane.

As mentioned above, the at least one polysiloxane may contain one more other reactive functional groups in addition to or instead of hydroxyl functional groups and/or carbamate functional groups, such as carboxyl groups, isocyanate groups, blocked isocyanate groups, carboxylate groups, primary amine groups, secondary amine groups, amide groups, urea groups, urethane groups, epoxy groups and mixtures of any of the aforementioned groups.

If at least one polysiloxane contains carboxyl functional groups, then the at least one polysiloxane can be synthesized by reacting at least one polysiloxane that contains hydroxyl functional groups, as described above, with a polycarboxylic acid or a polycarboxylic acid anhydride. Nonrestrictive examples of polycarboxylic acids suitable for use include adipic acid, succinic acid and dodecanedicarboxylic acid. Nonrestrictive examples of suitable anhydrides include those described above. The reaction conditions and the ratio of reactants are selected so that they form the desired functional groups.

In the case when at least one polysiloxane contains one or more isocyanate functional groups, the at least one polysiloxane can be synthesized by reacting at least one polysiloxane that contains hydroxyl functional groups as described above with a polyisocyanate such as a diisocyanate. Nonrestrictive examples of suitable polyisocyanates include aliphatic polyisocyanates, e.g., aliphatic diisocyanates, e.g., 1,4-tetramethylene diisocyanate and 1,6-hexamethylene diisocyanate, cycloaliphatic polyisocyanates, e.g., 1,4-cyclohexyl diisocyanate, isophorone diisocyanate and α,α-xylylene diisocyanate and aromatic polyisocyanates, e.g., 4,4'-diphenylmehane diisocyanate, 1,3-phenylene diisocyanate and toluoylene diisocyanate. These and other suitable polyisocyanates are described in detail in U.S. Pat. No. 4,046,729, column 5, line 26 to column 6, line 28. The reaction conditions and the ratio of reactants are selected so that the desired functional groups are formed.

The substituent group X in the structure (IV) may comprise a polymeric material containing urethane or urea and may contain as end groups isocyanate, hydroxyl, primary or secondary amine functional groups or mixtures of any of the aforementioned groups. If the substituent group X comprises such functional groups, the at least one polysiloxane may be the reaction product of at least one polysiloxane polyol as described above, one or more polyisocyanates and optionally one or more compounds having at least two active hydrogen atoms per molecule, selected from hydroxyl groups, primary amine groups and secondary amine groups.

Examples of suitable polyisocyanates include those described above. Examples of compounds having at least two active hydrogen atoms per molecule include polyols and polyamines containing primary and/or secondary amine groups.

Examples of suitable polyols include polyalkylene ether polyols including thio ethers, polyester polyols including polyhydroxy polyesteramides and polycaprolactones that contain hydroxyl and acrylic interpolymers containing hydroxyl. Polyether polyols formed in alkoxylation of various polyols may also be used, e.g., glycols such as ethylene glycol, 1,6-hexanediol, bisphenol A and similar or higher polyols such as trimethylolpropane, pentaerythritol and the like. Polyester polyols may also be used. These and other suitable polyols are described in U.S. Pat. No. 4,046,729 in column 7, line 52 to column 8, line 9, in column 8, line 29 to column 9, line 66 and in U.S. Pat. No. 3,919,315 in column 2, line 64 to column 3, line 33.

Examples of suitable polyamines include primary or secondary diamines or polyamines, in which the groups bound to the nitrogen atoms may be saturated or unsaturated, aliphatic, alicyclic, aromatic, aromatic-substituted aliphatic, aliphatic-substituted aromatic and heterocyclic. Examples of suitable aliphatic and alicyclic diamines include 1,2-ethylenediamine, 1,2-porphylenediamine[3], 1,8-octanediamine, isophoronediamine, propane-2,2-cyclohexylamine and the like. Suitable aromatic diamines include phenylenediamines and toluenediamines, e.g., o-phenylenediamine and p-tolylenediamine. These and other suitable polyamines are described in detail in U.S. Pat. No. 4,046,729 in column 6, line 61 to column 7, line 26.

[3] Translator's Note: Possible source error. The word "1,2-porphylenediamine" should probably be "1,2-probylene diamine".

In one embodiment, the substituent group X of structure (IV) may contain a polymeric group containing esters, this group containing as a terminal group hydroxyl functional groups or carboxylic acid functional groups. If X is such a group, at least one polysiloxane may be the reaction product of one or more polysiloxane polyols as described above, one or more materials having at least one carboxylic acid functional group and one or more organic polyols. Nonrestrictive suitable examples of materials having at least one carboxylic acid functional group include polymers containing carboxylic acid groups that are known in the industry, e.g., acrylic polymers containing carboxylic acid groups, polyester polymers and polyurethane polymers such as those described in U.S. Pat. No. 4,681,811. Nonrestrictive examples of suitable polymers include those described above.

To form the at least one polysiloxane containing epoxy groups, at least one polysiloxane that contains hydroxyl functional groups, as described above, may be reacted further with a polyepoxide. The polyepoxide may be an aliphatic or cycloaliphatic polyepoxide or mixtures of any of the polyepoxides mentioned above. Nonrestrictive examples of polyepoxides suitable for this use include epoxy functional acrylic acid copolymers synthesized from at least one ethylenically unsaturated monomer having at least one epoxy group, e.g., glycidyl(meth)acrylate and allylglycidyl ether and one or more ethylenically unsaturated monomers having no epoxy functionality. The synthesis of such epoxy functional acrylic copolymers is described in detail in U.S. Pat. No. 4,681,811 in column 4, line 52 to column 5, line 50. The reaction conditions and the ratio of reactants are selected so that the desired functional groups are formed.

The polysiloxane component (c) of the inventive clear coat enamel composition is suitably present in an amount of 1 to 10 wt %, preferably 1 to 5 wt %, based on the resin solids.

Component (d)

Component (d) of the inventive clear coat enamel composition is a delustering agent which is selected from metal oxides, metal silicates, metal borides, metal nitrides, metal carbides, metal carbonates and metal sulfides, preferably selected from boron nitride, zinc sulfide, aluminum silicates, magnesium silicates, silicon dioxide, aluminum oxide, titanium dioxide, zirconium dioxide and yttrium oxide.

It is advantageous here that the character-shaped [sic] inorganic material is not surface-modified and in particular is not hydrophobized. The component (d) preferably contains amorphous silicic acid. Suitable average particle sizes of the inorganic material of component (d) before being introduced into the coating composition are in the range of 4 to 8 μm, preferably 5 to 7 μm. Component (d) is suitably present in the clear coat enamel composition in an amount of 1 to 20 wt % preferably 3 to 15 wt %, based on the resin solids.

The crosslinking agent component (e) may contain any suitable crosslinking agent which is reacted with the functional groups of the film-forming resin or with the functional groups of the polysiloxane. Suitable crosslinking agents include aminoplastic resins[.] Polyisocyanates with free isocyanate groups, blocked polyisocyanates, polyepoxides, polycarboxylic acids and polyols. Aminoplastic resins suitable as curing agents for materials containing hydroxyl, carboxylic acid and carbonate functional groups are known from the prior art. Aminoplastics may be obtained by the condensation reaction of formaldehyde and an amine or amide. Examples of amines or amides include melamine, urea or benzoguanamine. Condensates with other amines or amides may be used, e.g., aldehyde condensates of glycouril. Although the aldehyde used most commonly is formaldehyde, other aldehydes such as acetaldehyde, crotonaldehyde and benzaldehyde may also be used.

Examples of aminoplastics include melamine, urea or benzoguanamine-formaldehyde condensates which in certain cases are at least partially etherified with one or more alcohols containing 1 to 4 carbons. Examples of suitable aminoplastic resins are commercially available, e.g., under the brand name CYMEL® from Cytec Industries, Inc. and under the brand name RESIMENE® from Solutia, Inc.

Other curing agents suitable for use here include polyisocyanate curing agents. As used here, the term "polyisocyanate" should include both blocked (or capped) polyisocyanates and unblocked polyisocyanates. The polyisocyanate may be an aliphatic or aromatic polyisocyanate or a mixture of the two polyisocyanates mentioned above, but aliphatic polyisocyanates are preferred.

Diisocyanates may be used, although higher polyisocyanates such as isocyanurates of diisocyanates are often used. Higher polyisocyanates may also be in combination with diisocyanates. Isocyanate prepolymers, e.g., the reaction products of polyisocyanates with polyols, may also be used. Mixtures of polyisocyanate curing agents may be used.

If the polyisocyanate is blocked or capped, any suitable aliphatic, cycloaliphatic or aromatic alkylmonoalcohol with which those skilled in the art are familiar may be used as the capping agent. Other suitable capping agents include oximes and lactams. Other curing agents that may be used include blocked polyisocyanate compounds, e.g., tricarbamoyl triazine compounds. In addition, anhydrides may be used as curing agents for materials containing hydroxyl functional groups; polyepoxides may be used as curing agents for materials containing carboxylic acid functional groups, polyacids may be used as curing agents for materials containing epoxy functional groups and polyols and polyamides may be used as curing agents for materials containing isocyanate functional groups.

If desired, suitable mixtures of curing agents may be used. It should be pointed out that the coating composition may be formulated as a single-component coating composition, in which case then a curing agent such as an aminoplastic resin or a blocked isocyanate, as described above, is used and mixed with the other coating composition components. The single-component coating composition is stable in storage as formulated. Alternatively, coating compositions may also be formulated as a two-component coating composition in which components (a) through (d) and optionally (f) as well as optionally a crosslinking agent, which does not contain any free isocyanate groups are present in one part, and a polyisocyanate with free isocyanate groups is present in another part and the two parts are mixed together only immediately before application.

According to one embodiment of the inventive clear coat enamel composition, the crosslinking agent component contains a combination of an aminoplastic resin and a polyisocyanate, preferably with free isocyanate groups. The weight ratio of aminoplastic resin to polyisocyanate may be from 1:5 to 1:20, preferably 1:8 to 1:15. The crosslinking agent component (e) may be present in an amount of 25 to 75 wt %, preferably 40 to 60 wt %, based on the resin solids, in the inventive clear coat enamel composition.

According to a preferred embodiment, the inventive composition contains a compound based on polyurea. Such compounds are known in the prior art and have been used to modify the rheology of coating compositions that can be applied by spray application to prevent and/or minimize the runoff of the sprayed coating composition, in particular from vertical surfaces. Such substances are referred to as antisag agents. It has now surprisingly been found that such antisag agents in particular in combination with non-surface-treated delustering agents, lead to especially favorable processing properties of the inventive clear coat enamel compositions. The antisag agents do not prevent the microscale particles used as the delustering agent according to component (d) from sedimenting during shipping or storage of the composition. However, the deposits formed are soft and can easily be redispersed by comparatively minor shearing forces such as those which occur, for example, in operation of a ring line such as those conventionally used in automotive enameling. Thus the inventive clear coat enamel compositions containing component (t) are surprisingly stable in ring line systems and are stable in storage.

Component (f) may be selected from
i) a compound obtained by reaction of a polyisocyanate with a monoamine or a monoisocyanate with a polyamine, optionally in the presence of an amino formaldehyde resin,
ii) a compound obtained by reaction of an isocyanurate trimer of a diisocyanate with an amine which contains at least one primary amino group,
iii) a compound obtained by reaction of an aliphatic or homocyclic diisocyanate and a monoamine or diamine with at least one primary amino group and ether group, and
iv) combinations thereof.

A detailed description of the inventive antisag agents can be found in U.S. Pat. Nos. 6,642,305, 4,677,028 and 4,851,294, for example.

Component (f) may be present in the inventive clear coat enamel composition in an amount of 1 to 10 wt %, preferably 2 to 8 wt %, based on the resin solids.

The inventive clear coat enamel composition may either be a solvent-based composition or a water-based composition. In particular, the components of the inventive clear coat enamel composition may be dissolved and/or dispersed in an organic solvent. Examples of suitable organic solvents include alcohols such as butanol, ketones such as methyl amyl ketone, aromatic hydrocarbons such as xylene and glycol ethers, esters, other solvents and mixtures of any of the aforementioned solvents. The organic solvent is usually present in solvent-based compositions in amounts in the range of 5 to 80 wt %, based on the total weight of the resin solids.

In addition, the inventive clear coat enamel composition may contain the usual additives such as catalysts, plasticizers, surface active agents, thixotropic agents, antigasing agents, organic cosolvents, flow control agents, sterically hindered amines as light stabilizers, antioxidants, UV absorbers and similar additives known from the prior art. These additives may be present in the inventive clear coat enamel compositions in a total amount of up to 40 wt %, based on the total weight of the resin solids.

The present invention will now be illustrated on the basis of the following examples.

EXAMPLES

In the following examples, the parts or percentage amounts are based on weight unless otherwise indicated.
Production Example for a Silicon Dioxide Dispersion:
An inventive polysiloxane polyol was prepared from the following mixture as indicated in Table 1:

TABLE 1

| Component | Equivalent weight | Equivalents | Parts by weight (kg) |
|---|---|---|---|
| Batch I | | | |
| Trimethylolpropane monoallyl ether | 174.0 | 756.0 | 131.54 |
| Batch II | | | |
| MASILWAX ® BASE[1] | 156.7 | 594.8 | 93.21 |
| Batch III | | | |
| Chloroplatinic acid | | 10 ppm | |
| Toluene | | | 0.23 |
| Isopropanol | | | 0.07 |

[1]Silicon hydride functional polysiloxane obtainable from BASF

Batch 1 and an amount of sodium bicarbonate corresponding to 20 to 25 ppm, based on the total monomer solids, were placed in a suitable reaction vessel equipped with means for maintaining a nitrogen inert gas atmosphere. The temperature was gradually raised to 75° C. under a nitrogen atmosphere. At this temperature, approx. 5% of batch 2 was added while stirring, followed by the addition of batch 3. Because of the exothermic reaction, the temperature rose to 95° C. At this point in time, the remainder of batch 2 was added in such a way that the temperature did not exceed 95° C. After the end of the addition, the reaction temperature was kept at 95° C. and the disappearance of the silicon hydride absorption band was monitored by means of infrared spectroscopy (SiH, 2150 $cm^{-1}$).

To produce this silicon dioxide dispersion, a four-neck reaction flask equipped for vacuum distillation was flushed with nitrogen. To the flask were added 1051.1 g of the siloxane polyol prepared as described above, 1025.8 g organosilicasol MTSTM, a colloidal silicon dioxide obtained from Nissan Chemicals, and 480.3 g methyl amyl ketone. The resulting mixture was subjected to vacuum distillation for 4 hours at 25° C.

Comparative Example 1

A clear coat enamel coating composition was prepared using the ingredients listed in Table 2 by combining and mixing the ingredients according to pack 1 and pack 2. Pack 1 and pack 2 were mixed together immediately before being applied to the test plates.

TABLE 2

| Ingredient | Resin solid (g) | Inorganic solid (g) | Weight in (g) |
|---|---|---|---|
| Pack 1 | | | |
| Methyl amyl ketone | | | 35.0 |
| Ethyl-3-ethoxypropionate | | | 11.9 |
| Silicon dioxide dispersion according to Example 1 | 4.7 | 2.0 | 8.6 |
| TINUVIN © 928[1] | | | 3.0 |
| CYMEL © 202[2] | 15.0 | | 18.8 |
| Acrylic polyol[3] | 23.6 | | 47.2 |
| Polyester polyol[4] | 20.3 | | 25.3 |
| Polysiloxane of the dispersion according to Example 1 | 10.4 | | 10.4 |
| TINUVIN © 294[5] | | | 0.5 |
| Flow control agent[6] | | | 0.5 |
| Pack 2 | | | |
| DESMODUR © N-3390[7] | 26.0 | | 28.9 |
| Catalyst[8] | | | 1.3 |

[1]UV absorbent obtainable from Ciba Geigy
[2]Aminoplastic resin obtainable from Cytec Industries
[3]Acrylic polyol: (34.8% HEMA, 23.4% 2-EHMA, 20.8% 2-EHA, 20% styrene, 1% MAA) 51% in 1:1 xylene/butyl acetate Mw = 7200, $M_n$ = 2850
[4]Polyester polyol: (32% 4-methylhexahydrophthalic acid anhydride, 22.9% 1,6-hexanediol, 18.6% trimethylolpropane, 18.4% adipic acid, 8.1% trimethylpentanediol) 80% in 60:40 butyl acetate/Solvesso 100, hydroxyl number = 145
[5]Light stabilizer obtainable from Ciba Geigy
[6]Solution of polybutyl acrylate ($M_w$ = 6700, $M_n$ = 2600) in xylene
[7]Aliphatic polyisocyanate obtainable from Bayer Material Science
[8]Phenylic acid phosphate in butyl acetate Example 1

Comparative Example 1 was repeated, except that the ingredients according to Table 3 were additionally added to pack 1.

TABLE 3

| Ingredient | Resin solid (g) | Inorganic solid (g) | Weight in (g) |
|---|---|---|---|
| Syloid © ED 3[1] | | 16.0 | 16.0 |
| SETALUX © 71761[2] | 4.2 | | 7.0 |

[1]Amorphous non-surface-treated silicon dioxide with an average particle size of 5.3-6.3 μm obtainable from Grace Davison
[2]Antisag agent based on polyurea obtainable from Nuplex Scratch Resistance:

Test metal plates pretreated with adhesion mediators were washed and dried and then coated with a black base coat containing solvent obtainable from PPG Industries Inc. under the brand name CBCK 855A. This enamel was applied in two spray operations to a total dry film thickness of 20 to 25 μm, with the coating being air dried for 90 seconds at ambient temperature between the two spray operations. The base coat composition of the coated metal plates was then air dried for 90 seconds at ambient temperature before applying the clear coat enamel composition according to Comparative Example 1 and Example 1 in a dry film thickness of 40 to 45 μm. The plates coated with the clear coat enamel composition were left to air dry for 10 minutes at ambient temperature and then cured for 40 minutes at 123° C. The test metal plates produced in this way were then subjected to the measurement according to Table 4:

TABLE 4

| Example | Gloss | Gloss maintained after scratch test[1] in % |
|---|---|---|
| Comparative Example 1 | 85 (measured at 20°) | 70 |
| Example 1 | 20 (measured at 60°) | 92 |

[1]To determine the car wash stability, the coated plates were exposed to 10 abrasion cycles of an Amtec Kistler test device and the gloss was determined as indicated and then the preservation of the original gloss in percent was calculated.

As shown in Table 4, not only is it possible to produce a matte clear coat enamel using the inventive clear coat enamel composition in comparison with the known scratch-resistant clear coat enamels, but also the scratch resistance can be greatly improved.

Sedimentation Stability:

The clear coat enamel composition according to Example 1 was stored for 6 months in a glass bottle. A slight white sediment was formed but it could be dispersed again easily with a spatula.

This test was repeated using a modified clear coat enamel coating composition according to Example 1, in which non-surface-modified amorphous silicon dioxide was replaced by a conventional commercial surface modified amorphous silicon dioxide having a comparable average particle size. Although a slightly smaller amount of deposit was formed, it was much harder and could not be easily redispersed.

The test with the coating composition according to Example 1 was repeated again with yet another modification in which the antisag agent was omitted. After 1 to 2 months, a hard sediment was formed which could not be redispersed at all or could be redispersed only with difficulty.

The two modifications described above yield comparable results as shown by the scratch test in Example 1.

The tests of sedimentation stability show that a preferred embodiment of the inventive clear coat enamel composition containing a non-surface-modified delustering agent in combination with an antisag agent based on polyurea also yields definitely improved application properties, in particular sedimentation stability in storage, in addition to the improved scratch resistance.

The invention claimed is:

1. A clear coat enamel composition containing:
   a) at least one film-forming resin with at least two functional groups,
   b) at least one colorless particulate inorganic material having an average particle size of 1-500 nm before being introduced into the coating composition,
   c) at least one polysiloxane having at least one functional group,
   d) at least one colorless particulate inorganic material having an average particle size of 1-10 μm, which is preferably not surface-modified, before being introduced into the coating composition, e) at least one crosslinking agent with at least two functional groups, which are reactive with the functional groups of the film-forming resin (a) and/or with the functional groups of the polysiloxane (c), f) optionally a component based on polyurea, wherein the components (a), (c), (e) and (f) are each different.

2. The clear coat enamel composition according to claim 1, wherein the at least one film-forming resin is a polyol having a hydroxyl value of 100-200, selected from the group consisting of polyacrylic polyols, polyester polyols, polyether polyols and polyurethane polyols.

3. The clear coat enamel composition according to claim 1, wherein the resin component (a) contains a combination of at least one polyacrylic polyol and at least one polyester polyol.

4. The clear coat enamel composition according to claim 1, wherein the resin component (a) is present in an amount of 25-75 wt %, based on the resin solids.

5. The clear coat enamel composition according to claim 1, wherein component (b) is selected from the group consisting of metal oxides, metal silicates, metal borides, metal nitrides, metal carbides, metal carbonates and metal sulfides.

6. The clear coat enamel composition according to claim 1, wherein the component (b) contains colloidal silicic acid.

7. The clear coat enamel composition according to claim 1, wherein the component (b) is present in an amount of 0.01 to 20 wt %, based on the resin solids.

8. The clear coat enamel composition according to claim 1, wherein the polysiloxane has the following structures (I) or (II):

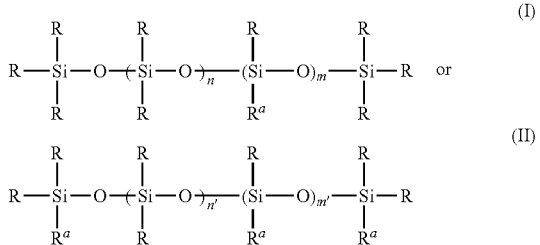

wherein m has a value of at least 1,
m' ranges from 0 to 75,
n ranges from 0 to 75,
n' ranges from 0 to 75,
each R independently of the others is selected from the group consisting of H, OH, single-bond hydrocarbon radicals, single-bond nonfunctional siloxane groups and combinations thereof, and $R^a$ has the following structure (III),

where $-R^3$ is selected from the group consisting of alkylene, alkoxylene, alkylene aryl, alkenylene, oxalkenylene and alkenylene aryl groups, and X stands for a group having at least one reactive functional group.

9. The clear coat enamel composition according to claim 8, wherein the reactive functional group is selected from the group consisting of a hydroxyl, carboxyl, isocyanate, blocked isocyanate, primary amine, secondary amine, amide, carbamate, urea, urethane, vinyl, unsaturated ester, fumarate, maleimide, anhydride, hydroxyalkylamide and epoxy group.

10. The clear coat enamel composition according to claim 8, wherein (n+m) and/or (n'+m') range from 2 to 9.

11. The clear coat enamel composition according to claim 1, wherein the polysiloxane is present in an amount of 1-10 wt %, based on the resin solids.

12. The clear coat enamel composition according to claim 1, wherein the component (d) is selected from the group consisting of metal oxides, metal silicates, metal borides, metal nitrides, metal carbides, metal carbonates and metal sulfides.

13. The clear coat enamel composition according to claim 10, wherein component (d) contains amorphous silicic acid.

14. The clear coat enamel composition according to claim 1, wherein component (d) is present in an amount of 1-20 wt %, based on the resin solids.

15. The clear coat enamel composition according to claim 1, wherein the average particle size of the inorganic material of component (d) is 4-8 µm, before being introduced into the coating composition.

16. The clear coat enamel composition according to claim 1, wherein the crosslinking agent component (e) contains at least one crosslinking agent selected from the group consisting of aminoplastic resins, polyisocyanates with free isocyanate groups, blocked polyisocyanates, polyepoxides, polycarboxylic acids and polyols.

17. The clear coat enamel composition according to claim 16, wherein the crosslinking agent component contains a combination of an aminoplastic resin and a polyisocyanate with free isocyanate groups.

18. The clear coat enamel composition according to claim 17, wherein the weight ratio of aminoplastic resin to polyisocyanate is from 1:5 to 1:20.

19. The clear coat enamel composition according to claim 1, wherein the crosslinking agent component (e) is present in an amount of 25-75 wt %, based on the resin solids.

20. The clear coat enamel composition according to claim 1, wherein component (f) is selected from
i) a compound obtained by reaction of a polyisocyanate with a monoamine or a monoisocyanate with a polyamine, optionally in the presence of an amino formaldehyde resin,
ii) a compound obtained by reaction of an isocyanurate trimer of a diisocyanate with an amine which contains at least one primary amino group,
iii) a compound obtained by reaction of an aliphatic or homocyclic diisocyanate and a monoamine or diamine with at least one primary amino group and ether group, and
iv) combinations thereof.

21. The clear coat enamel composition according to claim 1, wherein component (f) is present in an amount of 1-10 wt %, based on the resin solids.

22. The clear coat enamel composition according to claim 1, wherein the composition contains a polyisocyanate with free isocyanate groups, and the composition is stored in at least two parts, such that components a) through d), optionally f) and optionally a crosslinking agent which does not contain any free isocyanate groups are present in one part, and the polyisocyanate with free isocyanate groups is present in a second part, and the two parts are mixed before application.

23. A composite coating comprising
a base coat enamel containing colored pigments and/or effect pigments and
a clear coat enamel applied from a clear coat enamel composition according to claim 1 to at least a part of the base coat enamel layer.

* * * * *